US008825027B2

(12) United States Patent
Sung et al.

(10) Patent No.: US 8,825,027 B2
(45) Date of Patent: Sep. 2, 2014

(54) METHOD, USER EQUIPMENT AND SYSTEM FOR PROVIDING SIMULTANEOUS POC MULTIMEDIA SERVICES SESSION BY SESSION

(75) Inventors: Sang-Kyung Sung, Seoul (KR); Ji-Hye Lee, Seoul (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1279 days.

(21) Appl. No.: 11/714,075

(22) Filed: Mar. 5, 2007

(65) Prior Publication Data

US 2007/0218932 A1   Sep. 20, 2007

(30) Foreign Application Priority Data

Mar. 3, 2006 (KR) ........................ 10-2006-0020679

(51) Int. Cl.
*H04L 29/06* (2006.01)
*H04W 72/00* (2009.01)
*H04W 76/00* (2009.01)
*H04W 80/10* (2009.01)
*H04W 76/02* (2009.01)
*H04W 4/10* (2009.01)

(52) U.S. Cl.
CPC .......... *H04W 72/005* (2013.01); *H04W 76/005* (2013.01); *H04W 80/10* (2013.01); *H04W 76/02* (2013.01); *H04L 65/1006* (2013.01); *H04L 65/1016* (2013.01); *H04L 65/4061* (2013.01); *H04W 4/10* (2013.01)
USPC .................. 455/414.3; 455/414.1; 455/414.2; 455/426.1; 455/450; 455/464

(58) Field of Classification Search
CPC ....... H04H 60/46; H04H 60/80; H04H 60/85; H04W 74/04; H04W 4/10; H04W 28/12
USPC ................ 455/426.1, 414.1–414.4, 418–420, 455/422.1, 450–455, 464, 509; 370/908, 370/228, 227, 328–337, 339, 341–348, 370/431–463, 259–271; 709/227–237; 379/88.13; 725/62
See application file for complete search history.

(56) References Cited

U.S. PATENT DOCUMENTS

| 6,011,407 | A  | * | 1/2000 | New .............................. 326/39 |
| 6,782,769 | B2 | * | 8/2004 | Ludwig ........................ 73/865.8 |
| 8,239,547 | B2 | * | 8/2012 | Synnergren et al. .......... 709/228 |
| 2002/0003804 | A1 | * | 1/2002 | Hjalmtysson et al. ........ 370/410 |
| 2002/0107968 | A1 | * | 8/2002 | Horn et al. ..................... 709/230 |

(Continued)

FOREIGN PATENT DOCUMENTS

| KR | 1020070037050 | 4/2007 |
| KR | 1020070051598 | 5/2007 |

*Primary Examiner* — Ronald Eisner
(74) *Attorney, Agent, or Firm* — The Farrell Law Firm, P.C.

(57) ABSTRACT

A method, user equipment and system provide simultaneous Push-To-Talk (PTT) over Cellular (PoC) multimedia services. After a PoC client participates in multiple sessions according to a simultaneous PoC multimedia service or Enhanced Simultaneous Session Support (ESS) set by a user for a PoC multimedia call service, a PoC server can simultaneously transmit the media streams to the PoC client without filtering when media streams of the same media type are transmitted in different sessions. The client can set simultaneous multi-reception modes on a session-by-session basis according to a user's intention, and on a media type-by-media type basis in each session.

24 Claims, 7 Drawing Sheets

(56) References Cited

U.S. PATENT DOCUMENTS

| | | | |
|---|---|---|---|
| 2003/0018978 A1* | 1/2003 | Singal et al. | 725/115 |
| 2004/0015995 A1* | 1/2004 | Shao et al. | 725/87 |
| 2004/0057459 A1* | 3/2004 | Sharony et al. | 370/468 |
| 2004/0119814 A1* | 6/2004 | Clisham et al. | 348/14.08 |
| 2004/0230659 A1* | 11/2004 | Chase | 709/206 |
| 2004/0249949 A1* | 12/2004 | Gourraud et al. | 709/227 |
| 2005/0105511 A1* | 5/2005 | Poikselka | 370/352 |
| 2005/0124365 A1* | 6/2005 | Balasuriya et al. | 455/518 |
| 2005/0233776 A1* | 10/2005 | Allen et al. | 455/567 |
| 2006/0146822 A1* | 7/2006 | Kolakowski et al. | 370/390 |
| 2006/0248557 A1* | 11/2006 | Stark et al. | 725/37 |
| 2006/0288165 A1* | 12/2006 | Rosenbloom et al. | 711/115 |
| 2007/0076660 A1* | 4/2007 | Sung et al. | 370/329 |
| 2007/0121526 A1 | 5/2007 | Sung et al. | |
| 2008/0248762 A1* | 10/2008 | Lee et al. | 455/90.2 |

\* cited by examiner

| SDP PARAMETERS | |
|---|---|
| c= | IN IP6 50555::ccc:ddd:aaa:bbb |
| m= | audio 53456 RTP/AVP 97 98 |
| a= | rtpmap:97 AMR |
| a= | rtpmap:98 EVRC/8000 |
| a= | rtcp:53080 |
| m= | application 50000 udp TBCP |
| a= | fmtp:TBCP queuing=1; tb_priority=2; timestamp=1; ess=1 |

(b)

| SDP PARAMETERS | |
|---|---|
| c= | IN IP6 99055::fff:aaa:eee:bbb |
| m= | audio 99006 RTP/AVP 98 |
| a= | rtpmap:98 EVRC/8000 |
| a= | rtcp:90000 |
| m= | application 90000 udp TBCP |
| a= | fmtp:TBCP queuing=1; tb_priority=2; timestamp=1; ess=1 |

FIG.7

METHOD, USER EQUIPMENT AND SYSTEM FOR PROVIDING SIMULTANEOUS POC MULTIMEDIA SERVICES SESSION BY SESSION

PRIORITY

This application claims priority under 35 U.S.C. §119 to an application entitled "Method, User Equipment and System for Providing Simultaneous PoC Multimedia Services Session by Session" filed in the Korean Intellectual Property Office on Mar. 3, 2006 and assigned Serial No. 2006-20679, the contents of which are incorporated herein by reference.

BACKGROUND OF THE INVENTION

1. Field of the Invention

The present invention relates to a method, user equipment and system for providing simultaneous multimedia services session by session in response to a user's request when a Push-To-Talk (PTT) over Cellular (PoC) system for supporting multimedia simultaneously provides media streams of the same media type from different sessions.

2. Description of the Related Art

With the rapid development of mobile communication and the vast extension of communication networks, various extended services and applications using mobile phones are being provided. According to various user requests, services such as positioning, multimedia and Push-To-Talk (PTT) services are being provided beyond a simple call service. Specifically, the PTT service supports various additional functions such as instant messenger and state display functions, as well as a group call and a voice call that are possible in a conventional radio system or a Trunked Radio System (TRS).

A concept of this PTT service is being actively discussed to standardize a PTT over Cellular (PoC) service using a mobile communication network. One feature of the PoC service different from the conventional mobile communication service is that users can perform communication while moving between multiple sessions according to need. The requirement that users should be able to perform communication while moving between multiple sessions is prescribed in the standard of the Open Mobile Alliance (OMA) serving as an organization for developing a standard for a mobile communication service.

On the other hand, a PoC V 2.0 system supports a PoC multimedia call service. For this, the PoC V 2.0 system defines new multimedia types of video, image and text other than voice. Further, the PoC V 2.0 system supports a multi-session function included in the conventional PoC V 1.0. The current PoC system receives multiple streams (e.g., audio, video abd image) due to performance improvement in a User Equipment (UE) and transfers the multiple streams to a user.

However, the current PoC 1.0 system is set such that a PoC server (or Participating PoC Function (PF) entity) cannot basically transmit media streams of the same media type simultaneously to one PoC UE under multiple sessions. Due to this filtering function, the low-level PoC UE does not receive user desired media streams of the multiple sessions connected thereto even when a transmission channel supports a sufficient bandwidth. Further, the current PoC system does not provide a method for performing filtering on a media type-by-media type basis or setting up a filtering target session for multimedia.

A method is being considered which can simultaneously receive all redundant media for the multiple sessions in PF by setting a PoC service value to remove filtering for the multiple sessions in the prior art. However, this method cannot apply simultaneous multi-reception services session by session. Further, there is a problem in that a simultaneous multi-reception service cannot be activated when a client participating in multiple sessions requests a new session.

SUMMARY OF THE INVENTION

Therefore, the present invention provides a signaling method for implementing a simultaneous multimedia service that can simultaneously transmit multiple media streams of the same media type from sessions to a User Equipment (UE) according to session-by-session setup responses of a client by retrieving presence information of the multiple media streams of the same media type and asking the UE about setting of simultaneous multi-reception mode, and a UE and system for supporting the same.

Moreover, the present invention provides a method for setting simultaneous Push-To-Talk (PTT) over Cellular (PoC) multimedia services to be provided on a media type-by-media type basis in each session in a process for negotiating Session Initiation Protocol (SIP) based media for the simultaneous PoC multimedia services, and a UE and system for supporting the same.

In accordance with the present invention, there is provided a system for providing simultaneous PoC multimedia services session by session, including at least one PoC UE for sending a simultaneous multi-service request message when a user selects to simultaneously receive media streams of at least one identical type in multiple sessions, and a PoC server for providing the at least one PoC UE with a stream of a multimedia type specified by the simultaneous multi-service request message when receiving the simultaneous multi-service request message.

In accordance with the present invention, there is provided a method for providing simultaneous PoC multimedia services session by session, including sending a simultaneous multi-service request message to at least one PoC UE when a user selects to simultaneously receive media streams of at least one identical type in multiple sessions, and providing the at least one PoC UE with a stream of a multimedia type specified by the simultaneous multi-service request message when a PoC server receives the simultaneous multi-service request message.

In accordance with the present invention, there is provided a PoC UE for providing simultaneous PoC multimedia services session by session, including a data transceiver for transmitting data to and receiving data from a PoC server, a controller for sending a simultaneous multi-service request message when a user makes a selection to simultaneously receive media streams of at least one identical type in multiple sessions and processing data to display multimedia data received through the data transceiver, and a display unit for receiving the processed data from the controller and displaying the received data.

In accordance with the present invention, there is provided a system for providing simultaneous PoC multimedia services session by session, including a PoC UE for sending a simultaneous multi-service request message having simultaneous multi-reception values for requesting simultaneous multi-reception services on a session-by-session or media type-by-media type basis, and a PoC server for reading the simultaneous multi-reception values included in a new session request message, determining whether simultaneous receptions are required on the session-by-session or media type-by-media type basis, and setting filtering for an associated session in the session request message according to whether media of a new session to be opened is filtered.

In accordance with the present invention, there is provided a method for providing simultaneous PoC multimedia services session by session, including sending, by a PoC UE, a simultaneous multi-service request message having simultaneous multi-reception values for requesting simultaneous multi-reception services on a session-by-session or media type-by-media type basis, and reading, by a PoC server, the simultaneous multi-reception values included in a new session request message, determining whether simultaneous receptions are required on the session-by-session or media type-by-media type basis, and setting filtering for an associated session in the session request message according to whether media of a new session to be opened is filtered.

BRIEF DESCRIPTION OF THE DRAWINGS

The above and other features and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following, there will be described an example in which the present invention is applied to a PoC system for a PTT service using a cellular mobile communication network among PTT systems. Conventionally, the PoC system exploits a Session Initiation Protocol (SIP) and an SIP extension protocol in order to deliver session participation information of a group call and exploits an Extensible Markup Language (XML) Configuration Access Protocol (XCAP) for acquiring group information. Functions of the present invention as described below can be implemented by the above-described protocols. A basic structure of the present invention can exploit a PoC Release 1 system.

Figure 1:
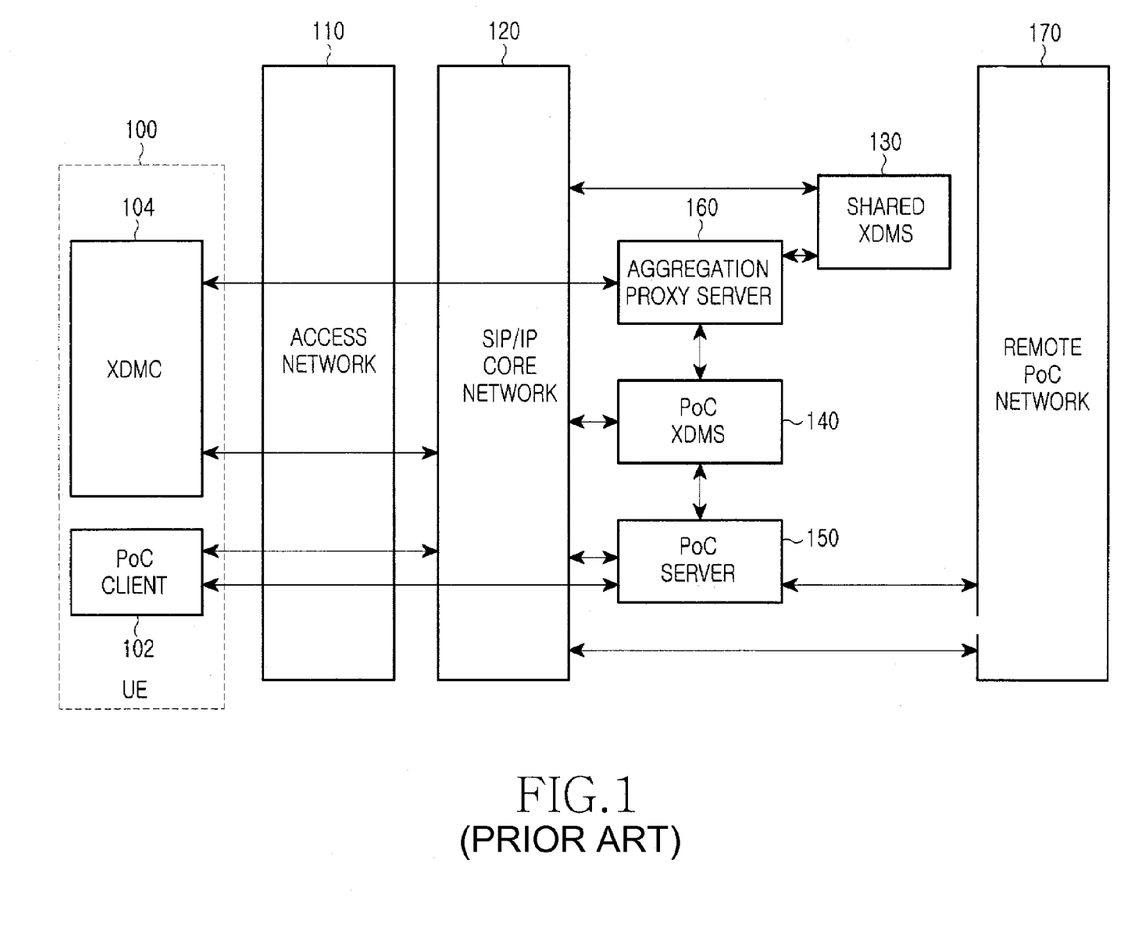
FIG. 1 illustrates a structure of a conventional PoC service system.

FIG. 1 is a diagram illustrating a conventional PoC service system and an associated network structure.

As illustrated in FIG. 1, the conventional PoC system can be configured with a PoC UE 100, XML Document Management Servers (XDMSs) 130 and 140 and a PoC server 150. The PoC system can further include an aggregation proxy server 160. These components can be connected through an access network 110, an SIP/Internet Protocol (IP) core network 120 and a remote PoC network 170.

The PoC UE 100 can include a PoC client 102 and an XML Document Management Client (XDMC) 104.

The PoC client 102 is a service requester embedded in the PoC UE 100 and accesses a network for providing a PoC service to a PoC service subscriber while residing in the PoC UE 100. The PoC service subscriber can receive the PoC service through the PoC UE in which the PoC client is embedded. Hereinafter, the term "PoC client" may be used as the general term for the UE in which the PoC client is embedded and the PoC service subscriber. Reference numeral denoting the PoC client will generally be omitted.

The PoC client has a main function for establishing a PoC session for the PoC service subscriber, i.e., the PoC client, participating in a pre-established session, or ending an established session. Also, the PoC client creates and transfers a talk burst, supports instant personal alert, and authenticates at the time of a connection to the PoC server, among other functions. The PoC client can be connected to the SIP/IP core network 120 serving as the core network for supporting SIP/IP multimedia through the access network 110.

The SIP/IP core network 120 is connected to at least the PoC server 150 and the XDMSs 130 and 140 to support the PoC service. In this case, the PoC server 150 can perform a controlling PoC function for maintaining and managing the PoC session or a participating PoC function for participating in the PoC session opened for one-to-one or multiparty communication.

On the other hand, the PoC service can be accompanied with a service for opening a group session as in a conference call. For this, the OMA standard defines the XDMC 104 and the XDMSs 130 and 140 for a group list service. As illustrated in FIG. 1, there are the PoC XDMS 140 used for the PoC service and the shared XDMS 130 commonly available in other service enablers. Information about a group or group members can be stored in the XDMSs 130 and 140 through the PoC client. The PoC client 102 can know information of PoC clients capable of being called thereby through an individual or group list sent from the XDMSs 130 and 140. Group and group member information stored in the XDMSs 130 and 140 can be generated, corrected and managed through communication networks such as the Internet and Intranet for utilization by a PoC service provider. Because an XML-document management protocol for generating, correcting and deleting a group list and its concrete contents are not directly related to the present invention, their detailed description is omitted herein.

When an aggregation proxy server 160 receives a group list-related request from the XDMC 104 for a group service, the received request is routed to the XDMSs 130 and 140 according to proper rule.

Figure 2:
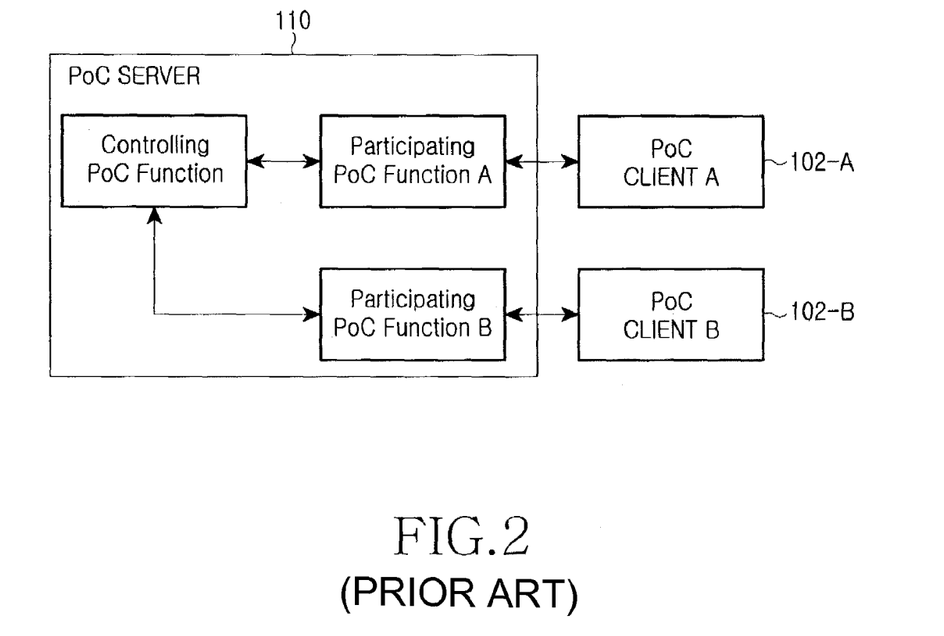
FIG. 2 illustrates functions of a conventional PoC server.

FIG. 2 illustrates a conventional PoC server.

Functions of the PoC server are divided into a controlling PoC function (CF) for maintaining and managing the overall PoC session and a participating PoC function (PF) responsible for maintenance and management between sessions. Function-by-function characteristics of the PoC server will be described with reference to Tables 1 and 2.

TABLE 1

Controlling PoC Function (CF)

Provides centralized PoC session handling
Provides the centralized Media distribution
Provides the centralized Talk Burst Arbitration functionality including talker identification

TABLE 1-continued

Controlling PoC Function (CF)

Provides SIP session handling, such as SIP session origination, termination, etc
Provides policy enforcement for participation in group sessions
Provides the participants information
Collects and provides centralized media quality information
Provides centralized charging reports
May Provide transcoding between different codecs
Support Talk Burst Control Protocol Negotiation As shown in Table 1, the CF performs, among functions of the PoC server, a function that manages the PoC sessions on the whole, particularly receives, sequences and authorizes the right-to-speak (or floor) requests of the PoC clients, distributes a talk burst requested by an arbitrary PoC client to all the other PoC clients participating in group calling, and provides information of the PoC clients participating in the group calling.

As shown in Table 2, the PF manages the sessions that are linked with the CF and the respective PoC clients in the PoC session. In particular, the PF relays the right-to-speak when the PoC client requests the right-to-speak or when the right-to-speak is assigned to the PoC client in the CF. Moreover, the PF relays media between the CF and the PoC client, performs transcoding when different codecs are used between the CF and the PoC client, and filters any one of two simultaneous sessions in response to the PoC client's selection when the PoC client participates in one session while participating in the other session.

TABLE 2

Participating PoC Function (PF)

Figure 3:
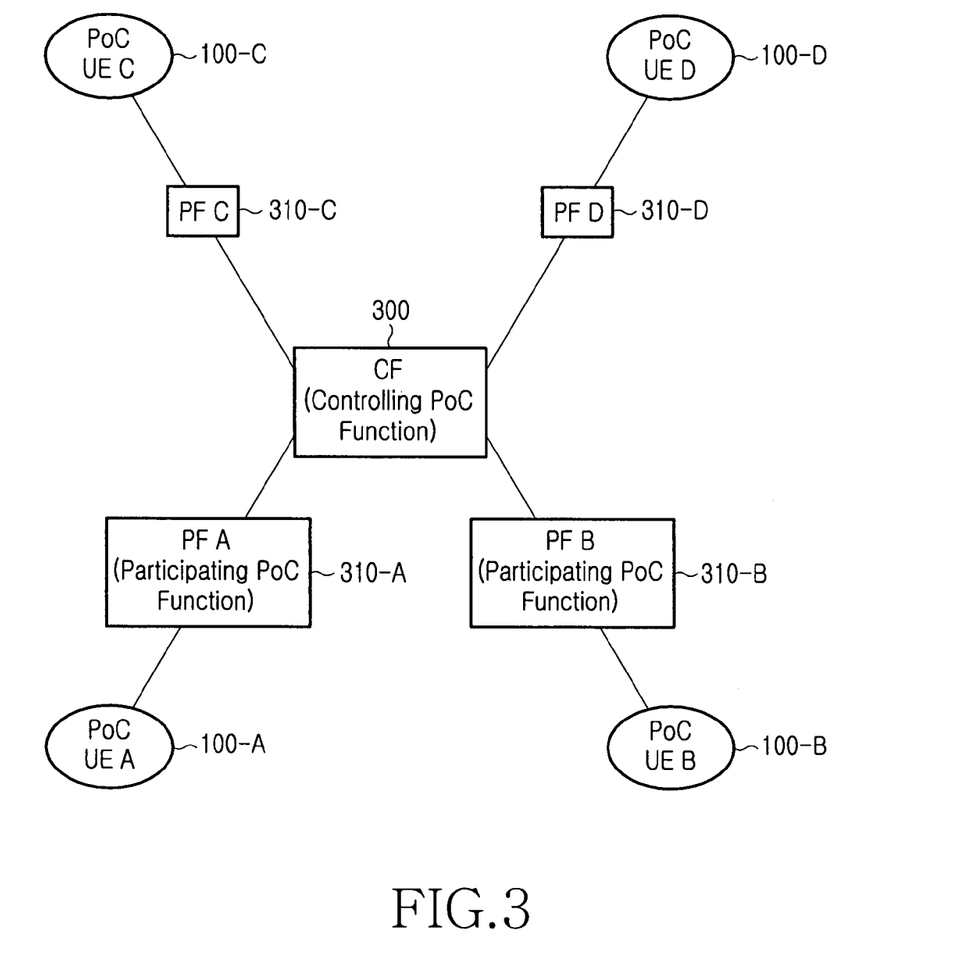
FIG. 3 illustrates a controlling PoC function block and a participating PoC function block of a PoC server in accordance with the present invention.

Provides PoC session handling
May provide the Media relay function between PoC Client and Controlling PoC server
May provide user media adaptation procedures
May provide the Talk Burst control message relay function PoC Client and Controlling PoC server
Provides SIP session handling, such as SIP session origination, termination, etc, on behalf of the represented PoC Client
Provides policy enforcement for incoming PoC session (e.g., access control, incoming PoC session barring, availability status, etc)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 illustrates a controlling PoC function block and a participating PoC function block of the PoC server.

Referring to FIG. 3, PoC clients 100-A to 100-D access a CF 300 through PFs 310-A to 310-D to set up a PoC session. For the speech of PoC clients having the floor assigned by the CF 300, media are provided to the respective PoC clients. At this time, the PoC client having the floor can make proper speech after identifying information of the PoC clients participating in a group session.

The call processing technology for a call connection in the PoC system can perform various procedures according to requests and situations of transmitting and receiving sides. Characteristics of the PoC system required by the OMA according to settings of the transmitting and receiving sides are as follows.

First, the receiving side can set its own answer mode according to the PoC client's request. The answer mode can be divided into automatic and manual answer modes. In the automatic answer mode, a receiver immediately sends the answer from an associated network to the transmitting side instead of the manual answer when an associated PoC client is included in a PoC client list designated by the receiving side. The network can automatically send the answer in place of the UE because the PoC server has a function for performing the answer mode and storing an associated user list according to an answer-mode setting request of the UE. The manual answer mode operates when an associated user is unclear or is not included in a user list relative to the automatic answer mode, or when the receiver sets the manual answer mode for all users. A PoC call request is sent to the user's UE through a receiving network and a call connection is established by permission of the PoC client.

Second, the PoC system classifies session modes into on-demand and pre-established session modes according to connection setup with the PoC server within a home network of a user. The pre-established session mode is technology for pre-establishing a session between the PoC client and the PoC server belonging to the home network thereof in response to the PoC client's request. This pre-established session is necessary to quickly open a session when the PoC client pre-negotiates media parameters to be later used with the PoC server without re-negotiating the media parameters with the PoC server.

For the pre-established session, the PoC client provides supportable media parameters to a body, i.e., a Session Description Protocol Multipurpose Internet Mail Extensions (SDP MIME) body, in an SIP INVITE method, provides media parameters received from the server, and responds to the media parameters received from the server. A response message from the server includes identification information of a newly pre-established session and a conference Uniform Resource Identifier (URI) and is returned to the PoC client.

When the above-described pre-established session is used, pre-negotiation can be performed for at least an IP address, a port number, a codec to be used, a media type and a talk burst control protocol. The on-demand session mode indicates a state in which PoC clients do not set up a pre-established session. In the on-demand session mode, a PoC call connection procedure is performed after receiving an INVITE message from a PoC client.

The answer mode set for a call request in the PoC system can be stored in both the PoC server serving as the network element and the PoC client serving as the user's UE.

When the answer mode is set in the home network for managing the PoC client, it is implemented in the PoC server for performing the PF within the home network to which the PoC client belongs.

When the answer mode is set in the network, the PF immediately and automatically sends a response of a session progress message to a call request network when a PoC call request is received from a different PoC server. Thus, if the automatic answer mode is set, it has a simpler call request procedure in comparison to when a response is made after a session setup message is transferred to the PoC client. Thus, an initial floor assignment time is reduced.

Because a result different from the user's response intention can occur according to when the automatic answer is made in the network, the answer mode can also be set in the PoC client. At this time, a priority of the answer mode of the PoC client is higher than that of the answer mode set in the network. This is to address a privacy problem when the answer mode is not reflected in real time due to a signal delay or error in the network if the PoC client changes its own answer mode and sends an answer mode update request to the PoC server.

The PoC service can set the answer mode of the user in both the PoC server and client. The answer mode is decided by the PoC client considering the most recent intention of the user. According to this decision, a media stream (of actual voice or video of the user) can be transferred.

A PoC multimedia session opening procedure in the PoC system with the above-described characteristics will be described.

The PoC client at the transmitting side sends a multimedia INVITE message using the SIP and makes a request for processing a call. Herein, multimedia can include various formats of audio, video, and text according to media types. In response to the request for processing a call, the PoC client at the receiving side takes various response procedures according to a pre-established session and answer mode setting in an associated PoC server. A call processing procedure for a PoC call will be described using a procedure for when the PoC clients at the transmitting and receiving sides are located in the same network.

The PoC client at the transmitting side sends, to an associated SIP/IP core network, an SIP INVITE request including SIP address information of the PoC client at the receiving side. At this time, the SIP INVITE message can further include elements of PoC address information of the PoC client at the transmitting side, required media parameters and characteristic value information indicating the PoC service. Herein, the "requested media parameters" can include a plurality of characteristic values indicative of at least an audio and video encoding method, rate and payload type when a requested session is a multimedia session.

The SIP INVITE message is transferred to a participating PoC server through an IP Multimedia Subsystem (IMS) server within an IMS network, i.e., a Proxy-Call Session Control Function (P-CSCF) and Serving-Call Session Control Function (S-CSCF), using a path query in a Dynamic Host Configuration Protocol (DHCP) server or Domain Name Server (DNS). When a general call request is made, the participating PoC server connected to the PoC client can be implemented separately from the controlling PoC server for managing a talk burst of an opened session. The SIP INVITE request sent to the PF entity is transferred to the CF entity of the controlling PoC server through the associated SIP/IP core network.

A PoC session control network with the CF receives a response message from a network at the receiving side after transferring an SIP INVITE request message to the network at the receiving side. The SIP response message from the network at the receiving side can be a provisional response message of 1xx, a successful response message of 2xx, or an error response message of 4xx~6xx according to setting of the PF and the PoC client at the receiving side. In the case of the automatic answer mode, an SIP 183 "session progress" signal can be received as a response message. Through this message, a connection between the PoC server and client can be established in the IMS network of a call requester. A call acknowledgment signal of the PoC client at the receiving side is returned as an SIP 183 "session progress" signal or an SIP 200 "OK" response, and is transferred to the PoC client through the PoC server of the CF and PF. When receiving the SIP 200 "OK" response or the SIP 183 "session progress" signal from the PoC server at the receiving side, the CF entity determines that a PoC call has been connected and sends a floor granted signal for assigning the floor for a talk burst to the PoC client at the transmitting side. The response of the SIP 200 "OK" or 183 "session progress" signal can be classified as a "confirmed" or "unconfirmed" response. The CF entity requires a buffering function when the "unconfirmed" response is received.

The PoC client at the transmitting side receives a talk burst transmission granted signal, for example, a floor granted signal for transferring call connection sound, through a Real Time Control Protocol (RTCP) after receiving the response signal to the SIP INVITE request signal. The floor granted signal is generated from the CF entity authorized to handle a talk burst and is sent to the PoC client through the PF entity for managing an associated PoC client. Because the floor granted signal uses a bearer path without use of the SIP, it can be sent without passing through the SIP/IP core network such as the IMS. When identifying the call connection sound, the PoC client sends media, for example, a voice stream, using a Real-time Transport Protocol (RTP).

To simultaneously transmit multiple media streams of the same media type under multiple sessions from the PF entity to the PoC UE in the PoC system, the structure and operation for providing a simultaneous multimedia service will be described.

Figure 4:
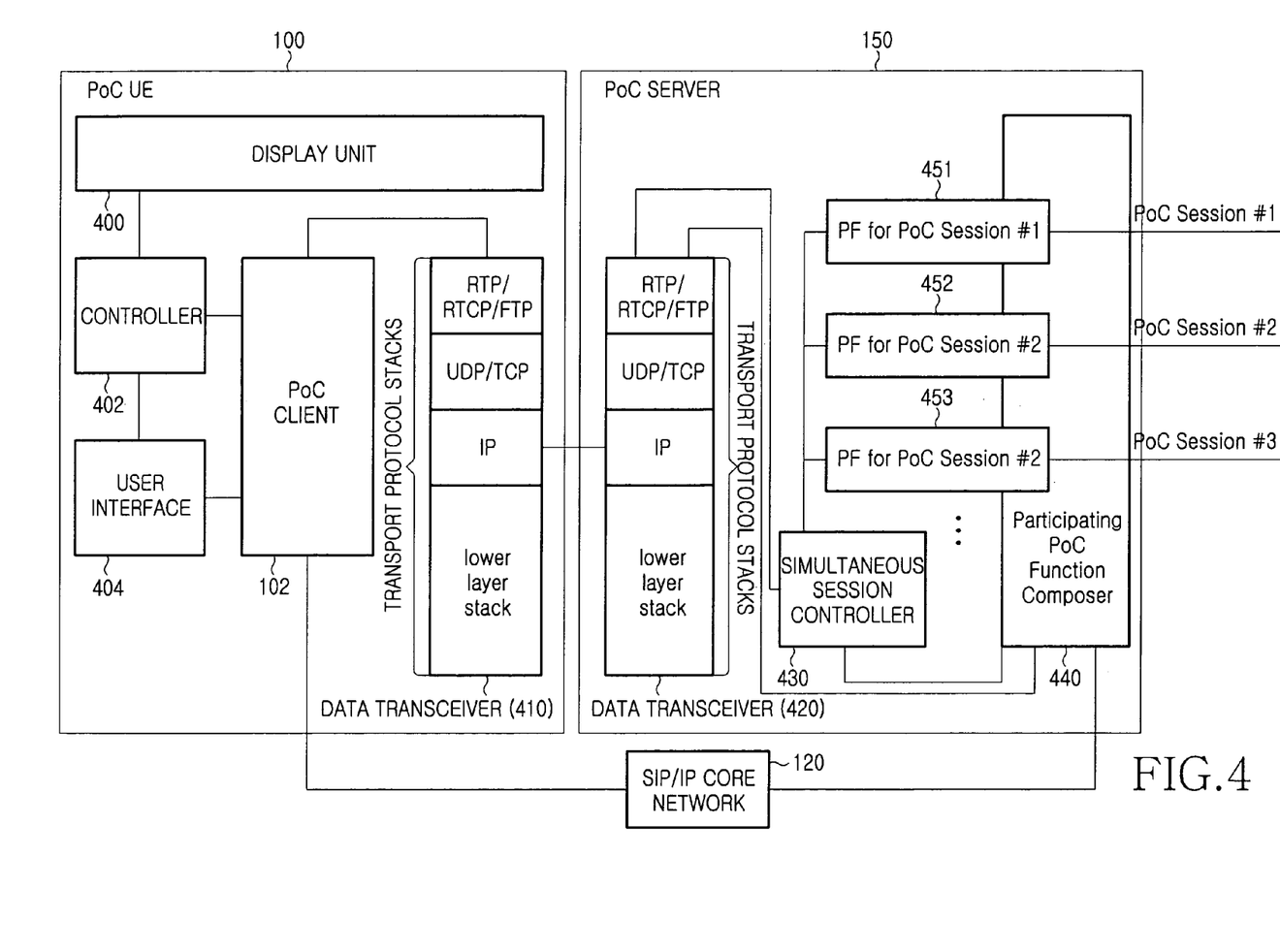
FIG. 4 is a block diagram illustrating a PoC UE and a PoC server in accordance with the present invention.

FIG. 4 is a block diagram illustrating a PoC UE and a PoC server in accordance with the present invention.

As illustrated in FIG. 4, the system of the present invention includes the PoC UE 100, the PoC server 150 and an SIP/IP core network 120.

In accordance with the present invention, the PoC server 150 can perform the CF or PF according to possession of a group session. However, the present invention considers only the PF for controlling multiple sessions of a multimedia PoC call. The PoC server 150 can be provided with a data transceiver 420, a simultaneous session controller 430, and a PF composer 440.

In the following, there will be given a description of the components of the PoC server 150.

The data transceiver 420 can include transport protocol stacks for transmitting and receiving packet data. The data transceiver 420 can include an RTP/RTCP/File Transfer Protocol (FTP) stack, User Datagram Protocol/Transport Control Protocol (UDP/TCP) stack, IP stack and lower layer stack.

When receiving a request from the PoC client, the simultaneous session controller 430 manages filtering of media streams of multiple sessions linked to at least the associated PoC client and a transmission size. The simultaneous session controller 430 outputs controlled media data to the data transceiver 420.

The PF composer 440 is used to support and manage multiple sessions. This PF composer 440 transfers media data received through the multiple sessions 451, 452 and 453, to the simultaneous session controller 430.

The PoC server 150 can be connected to the PoC client 102 through the SIP/IP core network 120 for supporting SIP based communication.

The PoC UE 100 can be configured with the PoC client 102, a display unit 400, a controller 402, a user interface 404, and a data transceiver 410.

The PoC client 102 sends a request for providing a simultaneous PoC multimedia service and media adaptation to the PF entity 440 through an SIP or RTCP message. Through the PF composer function, media adaptation of each media session is performed and the media adaptation result is transmitted to a mobile communication network. In the present invention, function blocks of the PF composer are not illustrated. Further, the PoC client 102 can display received media to the user by controlling the controller 402 to adjust a display for an associated media stream. In the following description, the terms "PoC UE" and "PoC client" are used interchangeably.

The display unit 400 outputs visual media such as an image and video, received from the PoC server 150. The controller 402 processes data to output the received data to the display unit 400. In the present invention, the display unit 400 and the controller 402 support multimedia.

The user interface 404 transfers the user's input to the PoC UE 100. In particular, the user interface 404 of the present invention is implemented such that the PoC client can change a display form in response to the PoC user's request. The data transceiver 410 can include transport protocol stacks for transmitting and receiving packet data. The data transceiver 410 can include a RTP/RTCP/FTP stack, UDP/TCP stack, IP stack and lower layer stack.

To provide a simultaneous multi-session PoC multimedia service, the PoC UE generates a service pre-request message and transmits the generated service pre-request message to the PoC server, such that the PoC server stores the service pre-request message. Thus, the PoC server performs a multi-session function after determining whether the PoC UE has set a multi-session multimedia service request if a simultaneous multi-session PoC multimedia service is to be provided.

The PoC UE can set a pre-request message for a simultaneous multi-service request in the PoC server when connected to multiple sessions. Then, the PoC UE receives a simultaneous multi-service proposal message included in a new session request message from the PoC server and sends a response message for indicating a successful reception to the PoC server. Further, when desiring to open a new session, the PoC UE can transmit a session request message including a simultaneous multi-service proposal to the PoC server. In simultaneous multi-reception mode for multimedia, the PoC UE can output sound of media and can display and reproduce the media using a user interface.

The function of the PoC server can be divided into two cases according to a direction of a multi-session request message.

When the PoC server in which the pre-request message has been set receives a new request message to be sent to the associated PoC UE, it acts as the PF entity and performs the following procedure. After reading a media type included in the new session request message, the PoC server adds a message field for asking whether filtering is required with respect to the associated media type and sends the session request message to the PoC UE if the read media type is the same as that of a different ongoing session. The PoC server receives a simultaneous multi-service response and performs filtering with respect to the associated session and media type.

When the PoC server in which the pre-request message has been set receives a new request message from the associated PoC UE, it operates as the CF or PF entity according to a group type and performs the following procedure.

First, when the PoC UE sends a new session request message to the PoC server in which the pre-request message has been set, simultaneous multi-reception values for requesting multi-reception services on a session-by-session or media type-by-media type basis are included and transmitted in the session request message.

Then, the PoC server reads the multi-reception values included in the new session request message received from the PoC UE and determines whether simultaneous receptions are required on the session-by-session or media type-by-media type basis. If a media type included in the session request message sent from the PoC UE is the same as that of a different ongoing session, the PoC server determines whether to perform filtering with respect to the associated media type in response to a simultaneous multi-reception service request from the PoC UE. When receiving a session success message from a network at a receiving side, the PoC server sends a session success response including the above-described message field to the associated PoC UE at a transmitting side. Thus, the PoC server can change and apply filtering policy with respect to the associated media type and PoC session.

The PoC UE can send, to the PoC server, simultaneous multi-session multimedia service requests on the media type-by-media type basis by designating a multimedia type for requesting simultaneous services.

When sending a simultaneous multi-session multimedia service request to the PoC server, the PoC UE can designate the number of multimedia PoC sessions for a simultaneous multi-service request. Further, the PoC UE can send the simultaneous multi-session multimedia service request to the PoC server while a session opening process is in progress and also can send the service request while a session is in progress through a session refresh.

Further, the proposed technology can apply the simultaneous multi-session multimedia service only to a particular session through a parameter proposal/response mechanism using an associated session request message to request simultaneous services.

In another method, the simultaneous multi-service request message and the response message can basically use an SIP method, but can transmit the messages using the RTCP APP format while a session is in progress. At this time, a simultaneous multi-reception service can be allowed for each media type by defining a new Media Burst Control Protocol (MBCP) message type (e.g. an MBCP unfilter message) for an MBCP message connected to a particular media type.

Multiple PoC multimedia sessions connected to one PoC UE can be at least one preset PoC multimedia session and a PoC multimedia session newly requested before the preset PoC multimedia session ends.

The PoC server can include a PF composer for managing multiple PoC multimedia sessions and a simultaneous session controller for setting the filtering policy of the PF composer within the PF entity.

In the present invention, the PoC UE can include a data transceiver for transmitting packet data to and receiving packet data from the PoC server, a controller for processing the packet data to display the packet data received through the data transceiver and a display unit for receiving and displaying the data processed by the controller.

When desiring to implement a simultaneous multimedia PoC service including the same media type in the system of the present invention as described above, the PoC UE 100 issues a command for applying filtering to multimedia in a multi-session request or a message transmission/reception at the time of a response according to the user's command. Then, the PoC server 150 performs filtering for multiple sessions in response to a request from the PoC UE 100 and transmits only the associated media data to the PoC UE 100 according to the requested filtering policy. In a typical method, the PoC UE 100 sets multiple sessions and the media type to which filtering, is applied using an SDP proposal/response process for a session update message or a new session INVITE message. Thus, the PoC server 150 performs a simultaneous multi-reception function.

The present invention can be implemented by any of employing an SIP or an RTCP message in a connected PoC session, newly defining a Multipurpose Internet Mail Extensions (MIME) parameter included in an SDP body in the SIP, and newly defining a new field in an MBCP message transmitted on a connected RTCP channel after opening an SIP session. Because these technologies are included in the principle of the present invention, a description is omitted herein.

Figure 5:
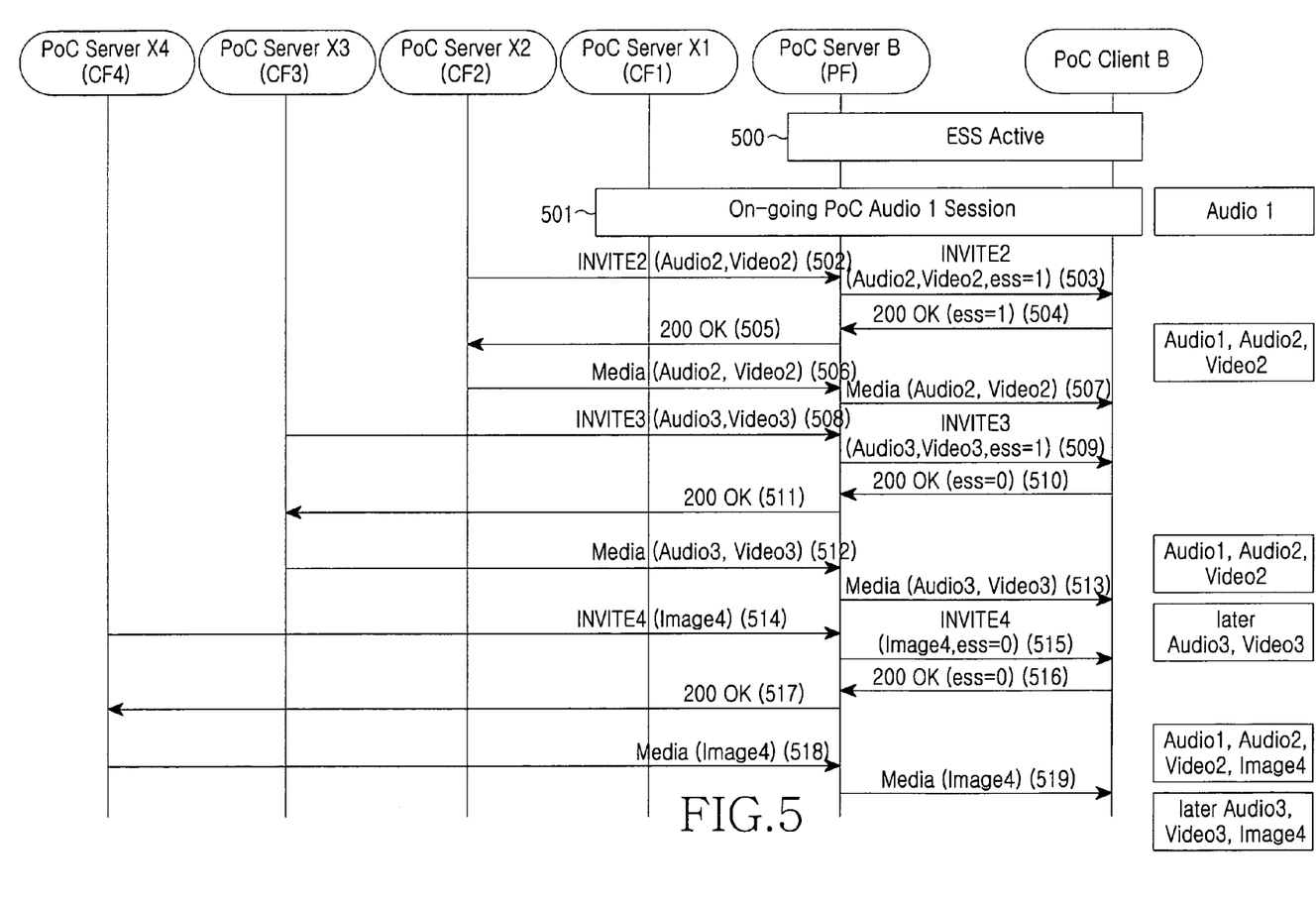
FIG. 5 is a signal flow diagram illustrating a procedure for providing simultaneous services in response to a simultaneous multi-session PoC multimedia service request from a PoC client in accordance with the present invention.

FIG. 5 illustrates a process for providing a PoC simultaneous multimedia service by negotiating media parameters using SIP signaling for opening a session between the PoC UE and the PoC server (or PF entity) in accordance with the present invention.

When receiving an INVITE message from the CF entity for managing other sessions, the PoC server (or PF entity) determines whether a type of media received by a PoC client B in an ongoing session is included in a media parameter of the INVITE message. If the same media type is included in the INVITE message, the PF entity adds a simultaneous multi-reception proposal value (ess=1) to an SDP parameter within the INVITE message in order to ask about the use of simultaneous multimedia services of the PoC client B at a receiving side. An MIME parameter of the simultaneous multi-reception proposal value will be described with reference to FIG. 7. Then, the PF entity transmits an INVITE message including an additional media parameter to the PoC client B and receives a response indicating whether simultaneous multimedia services are to be executed for an associated session from the PoC client B. When receiving an INVITE message containing a media type different from that of the ongoing session, the PF entity does not include the simultaneous multi-reception proposal value or sets the proposal value to 0.

In particular, FIG. 5 illustrates a simultaneous service request for a new session when a PoC UE for which a session has been already opened receives a session request message from a different session. The same principle of the present invention can be applied to a new session request for the PoC UE.

First, a pre-request message of a simultaneous multi-reception service is stored such that a simultaneous multi-session function is negotiated between the PoC client B and the PoC server B (or the PF entity) in step 500. According to the pre-request message, the PF entity is activated in an "ESS Active" state. For convenience, it is assumed that the PoC client is already connected to one audio PoC session in step 501.

Because the PF entity is activated in the "ESS Active" state in step 500, it determines that a media type of Audio2 equal to that of Audio1 currently being received by the PoC client B in an ongoing session is present in a media stream when receiving an INVITE2 message for providing media of Audio2 and Video2. Then, the PF entity adds a parameter (ess=1) corresponding to the simultaneous multi-reception proposal value to the INVITE2 message and sends the INVITE2 message containing Audio2, Video2 and the parameter (ess=1) to the PoC client B in step 503. When the PoC client B receiving the INVITE2 message desires a simultaneous multi-reception service according to the user's response, it sends a 200 OK message containing the simultaneous multi-reception proposal value (ess=1) to the PF entity in step 504.

When receiving the 200 OK message corresponding to the response message containing the simultaneous multi-reception response value from the PoC client B, the PF entity sends the 200 OK message to an associated CF2 entity in step 505. When receiving the 200 OK message, the CF2 entity determines that the simultaneous multi-reception response value contained in the 200 OK message has been set to "ess=1" and sends media data containing Audio2 and Video2 to the PF entity. Regardless of the case where a media stream of the same media type in a different ongoing session is transmitted to the PoC client B, the PF entity simultaneously transmits media data containing Audio2 and Video2 received in step 506 to the PoC client B in step 507.

Then, the PoC client B simultaneously receives Audio1, Audio2 and Video2 from different sessions.

When receiving an INVITE3 message for providing media of Audio3 and Video3 from a CF3 entity in step 508, the PF entity sends the INVITE3 message containing the parameter (ess=1) to the PoC client B in step 509. That is, the PF entity determines whether to open a session for transmitting, to the PoC client, a media stream of a media type equal to that of media to be received from a different ongoing session.

When receiving the INVITE3 message, the PoC client B sends, to the PF entity, a response message containing a response value indicating whether simultaneous multi-reception mode is required for the same media type of a session request from the CF3 entity in response to the user's selection. In step 510, the PoC client B sends, to the PF entity, a 200 OK message in which a response value (ess=0) indicates the user's selection of non-simultaneous multi-reception mode for the same media type of the session request from the CF3 entity in step 510. Then, the PF entity sends the 200 OK message received from the PoC client B to the associated CF3 entity in step 511.

When receiving the 200 OK message, the CF3 entity transmits media data containing Audio3 and Video3 to the PF entity in step 512. Then, the PF entity determines that the non-simultaneous multi-reception mode for the same media type of the session request from the CF3 entity has been selected from the response message received from the PoC client B in step 510. The PF entity does not transmit media streams of Audio3 and Video3 to the PoC client B while the PoC client B receives media streams of Audio1, Audio2 and Video2 of the same media types between different ongoing sessions.

When the PoC client B completely receives the media streams of Audio1, Audio2 and Video2 corresponding to the same media types between the different sessions within an effective period of a timer for allowing a media transmission in the associated session, the PF entity sends the media streams of Audio3 and Video3 to the PoC client B in step 513. Then, the PoC client B can receive the media streams of Audio3 and Video3 from the associated session.

When the PF entity receives an INVITE4 message for providing a media stream of Image4 from a CF4 entity in step 514, it sends the INVITE4 message containing the parameter (ess=0) to the PoC client B in step 515 because a session is opened for a media stream of a media type different from that of media to be received in a different ongoing session. In step 516, the PoC client B sends, to the PF entity, a 200 OK message corresponding to a response message containing a response value (ess=0) indicating the non-simultaneous multi-reception mode in response to the user's selection. When receiving the 200 OK message containing the parameter (ess=0), the PF entity sends the 200 OK message to the associated CF4 entity in step 517. When receiving the media stream of Image4 from the CF4 entity in step 518, the PF entity transmits the media stream of Image4 to the PoC client B in step 519. At this time, the PoC client B can receive the media stream of Image4 in addition to the media streams of Audio1, Audio2, and Video2, or the media streams of Audio3 and Video3.

Because the media type of Image4 is different from that of media currently being received in the ongoing session, the PF entity may not include the parameter (ess=0) in the INVITE4 message in step 515, and therefore the PoC client may not include the parameter (ess=0) in the 200 OK message in step 516.

Numbers of the INVITE messages and the media parameters such as INVITE1, INVITE2, Audio1 and Video2 are information for identifying a session in the description relating to FIG. 5. The INVITE messages are received from different CF entities and are used to open different sessions.

In the present invention, the PF entity identifies presence information of multiple media streams of the same media type under simultaneous sessions, sends information about setting of the simultaneous multi-reception mode to the PoC client, and simultaneously sends multiple media streams of the same media type to the associated PoC client according to a response indicating setting of the simultaneous multi-reception mode in each session.

The present invention provides a method for setting PoC simultaneous multimedia services on a media type-by-media type basis in each session in an SIP based media negotiation process for simultaneous multimedia services.

A procedure for setting simultaneous multi-reception modes on the media type-by-media type basis in one session will be described with reference to FIG. 6. First, it is assumed that the procedure proceeds to step 602 of FIG. 6 after performing steps 500 to 507 of FIG. 5. Further, it is assumed that steps 600 and 601 are respectively the same as steps 506 and 507 of FIG. 5.

Then, when receiving the INVITE3 message for providing media streams of Audio3 and Video3 from the CF3 entity in step 602, the PF entity sends, to the PoC client B, the INVITE3 message containing parameters "a_ess=1" and "v_ess=1" for asking about whether simultaneous receptions are required for multiple media types equal to those of media streams currently being received from simultaneous sessions in which the associated PoC client B participates in step 603.

When receiving the INVITE3 message, the PoC client B sets simultaneous multi-reception modes on a media type-by-media type basis in a 200 OK message according to the PoC user's selection and makes a response. When the PoC user selects the simultaneous multi-reception mode for the video type rather than the audio type, the PoC client includes the parameters containing "a_ess=0" and "v_ess=1" in a response message and sends the response message to the PF entity in step 604.

When receiving a 200 OK message containing simultaneous multi-reception response values for indicating the simultaneous multi-reception modes for multiple media types, the PF entity sends the 200 OK message to the CF3 entity in step 605. At this time, the PF entity can send, to the associated CF3 entity, the 200 OK message from which the simultaneous multi-reception response values have been removed.

When receiving media streams of Audio3 and Video3 from the CF3 entity in step 606, the PF entity transmits only a media stream of Video3 requested for simultaneous receptions between the media streams of Audio3 and Video3 received from the CF3 entity according to decision of the PoC client B. Thus, the PoC client can simultaneously receive the media streams of Audio1, Audio2, and Video3.

When a reception of the media type (a_ess=0) for which the PoC client B has rejected the simultaneous multi-reception mode among the same media types between different sessions within an effective period of a timer for allowing a media transmission in an associated session is completed in a different session, the PF entity transmits a media stream of Audio3, such that the PoC client can simultaneously receive the media stream of Audio3 and the media stream of Video2 or Video3 that has not been completely received in step 607.

Figure 7:
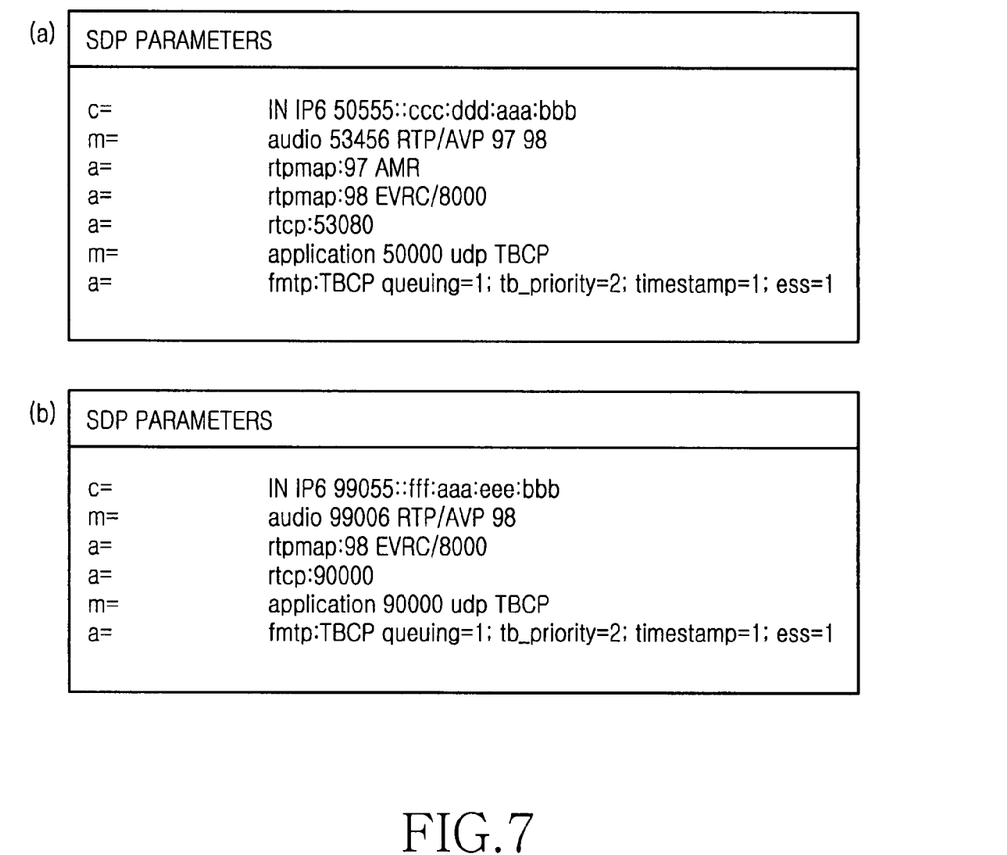
FIG. 7 illustrates Session Description Protocol (SDP) parameters for setting a simultaneous multi-reception value in an INVITE message and a 200 OK response of FIG. 5.

FIG. 7 illustrates SDP parameters for setting a simultaneous multi-reception value in an INVITE message and a 200 OK response of FIG. 5. FIG. 7(a) illustrates SDP parameters within the INVITE message and FIG. 7(b) illustrates SDP parameters within the 200 OK message.

The MBCP MIME parameter for indicating a simultaneous multi-reception proposal and response is defined by "ess" on an attribute line of the SDP parameters within the INVITE message and the 200 OK message. At this time, a value of "ess=1" from the PoC server is a proposal value for asking about whether a simultaneous multi-reception service is to be used, and a value of "ess=1" from the PoC client is a response value for indicating that the user uses the simultaneous multi-reception service for an associated session.

Further, the value of "ess=0" from the client is a response value for indicating that the user does not use a simultaneous multi-reception service for the associated session. The value of "ess=0" from the server is an inserted value when an "ess" parameter is set but a redundant media type is absent. Because this case is not a target of the simultaneous multi-reception service, the "ess" parameter can be omitted in the INVITE message.

Figure 6:
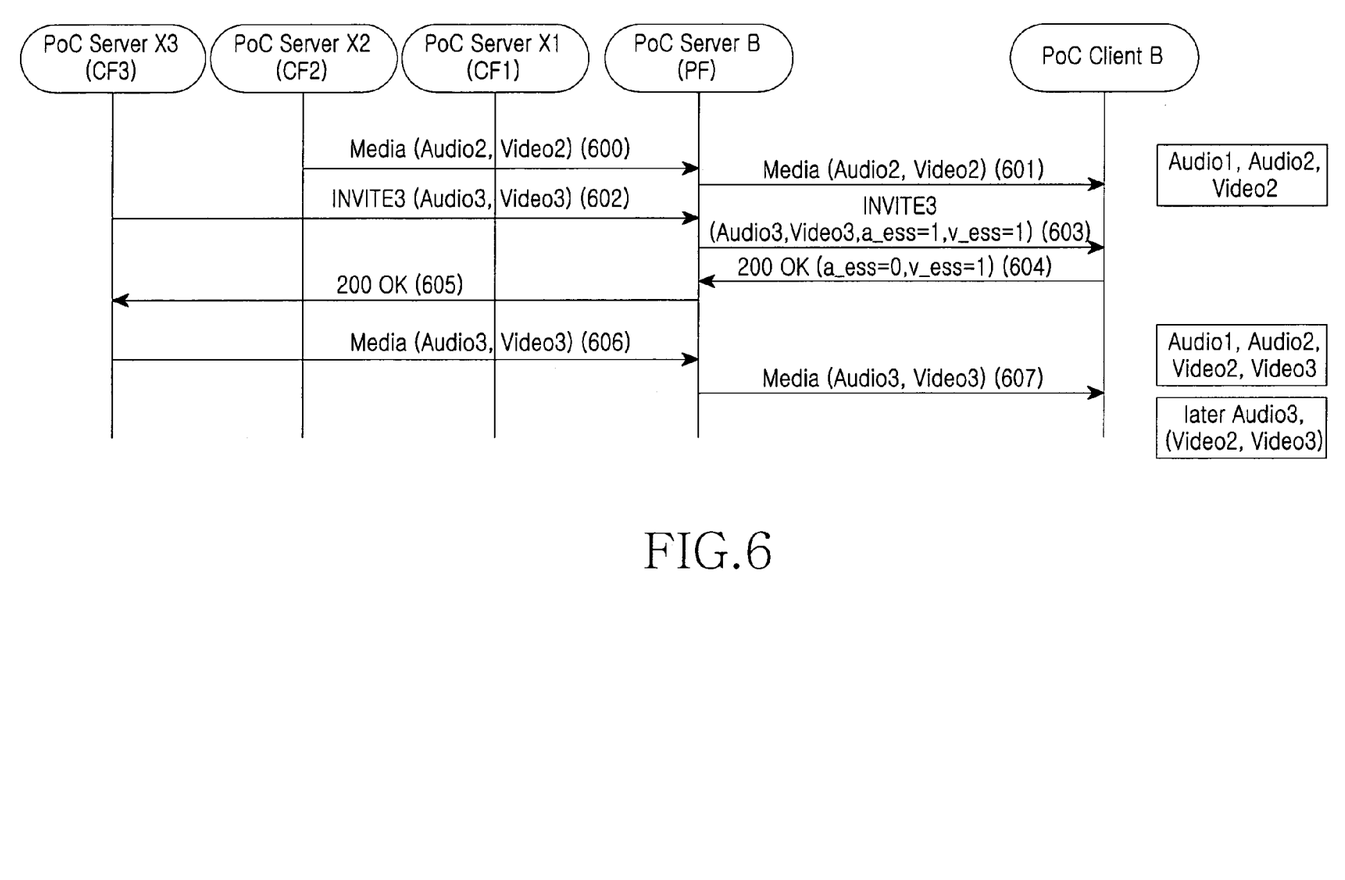
FIG. 6 is a signal flow diagram illustrating a procedure for setting simultaneous multi-reception modes on a media type-by-media type basis in one session in accordance with the present invention.

Because SDP parameters for simultaneous multi-reception services can be set on a media type-by-media type basis according to the same method as illustrated in FIG. 6, a description is omitted.

When the PoC server in which the pre-request message has been set receives a new session request from an associated PoC UE, a procedure for requesting simultaneous multi-reception services on a session-by-session or media type-by-media type basis can be implemented by the same technology using an SDP parameter proposal/response method. Thus, a concrete embodiment is omitted.

In another method, a simultaneous multi-reception service for multimedia can be provided using only the SDP parameter proposal/response method even when the pre-request message is not set or Enhanced Simultaneous Session Support (ESS) is deactivated. At this time, the PoC server automatically compares a media type of an ongoing session with those of all session request messages and proposes a simultaneous multi-reception service parameter or makes a response thereto. Thus, media filtering is selectively applied.

The present invention is not limited to names used in a particular embodiment. The present invention can be applied to all parameters with the same function even though they may have different names.

As described above, the present invention can provide multiple PoC multimedia services for one PoC client. Further, the present invention can apply simultaneous multimedia services on a media type-by-media type or session-by-session basis with respect to media streams to be simultaneously provided for one PoC client, thereby effectively employing an improved function of the PoC UE for displaying multimedia received using at least a PoC box.

The present invention can implement simultaneous multi-reception services for multimedia streams on a session-by-session or media type-by-media type basis in multiple PoC sessions through a media parameter negotiation process included in a session opening process when a request for opening a session including the same multimedia is sent for a PoC client participating in a multimedia PoC session call. The present invention can simultaneously display at least two video or image streams to one UE, and can receive and store at least two voice streams in a PoC box or reproduce background voice.

What is claimed is:

1. A first server for providing simultaneous multimedia services to at least one User Equipment (UE) on a session-by-session basis through a Session Initiation Protocol (SIP) core network, comprising:
   a data transceiver for transmitting multimedia service data to and receiving multimedia service data from the at least one UE, and for receiving a simultaneous multi-service request message for requesting media streams of an identical media type in multiple sessions, the media streams of the identical media type being provided simultaneously in each of the multiple sessions, wherein the simultaneous multi-service request message includes filtering-information which includes information identifying at least one media type and session to be filtered by the first server;
   a Participating Push-To-Talk Over Cellular Function (PF) composer for transferring the media streams of the identical media type in multiple sessions to a simultaneous session controller; and
   the simultaneous session controller for identifying the simultaneous multi-service request message received from the at least one UE, and determining whether to provide the at least one media type and session according to the filtering-information in the simultaneous multi-service request message.

2. The first server of claim 1, wherein the first server receives a session request message for providing at least one media from a second server for managing a session other than a current session in which the at least one UE participates and sends, to the at least one UE, a participation request message by adding a simultaneous multi-reception proposal value to request a response message indicating whether a simultaneous multimedia service is used when a media type of the session request message is the same as a type of media provided to the at least one UE.

3. The first server of claim 2, wherein the simultaneous multi-reception proposal value is used to request a response indicating whether simultaneous reception of all media provided in different sessions is required.

4. The first server of claim 3, wherein when the response message is received from the at least one UE and a media stream is received from the second server sending the session request message, the first server transmits the media stream received from the second server to the at least one UE if the response value included in the response message is a value for a simultaneous multi-reception mode in an associated session after reading the response value included in the response message.

5. The first server of claim 3, wherein, when a media stream of a media type currently being received is completely received within an effective period of a timer for allowing a media transmission, the first server transmits the media stream received from the second server if a response value included in the response message is a value for a non-simultaneous multi-reception mode in an associated session after reading the response value included in the response message.

6. The first server of claim 2, wherein the simultaneous multi-reception proposal value is used to request a response indicating whether simultaneous reception is required for at least one media type which is the same as a media type of a media stream currently being received in simultaneous sessions.

7. The first server of claim 6, wherein when the response message is received from the at least one UE and a media stream is received from the second server sending the session request message, the first server transmits only a media stream of a media type requested for the simultaneous reception after reading the media type requested for the simultaneous reception indicated in the response message.

8. The first server of claim 7, wherein the first server transmits a media stream of a rejected media type when the at least one UE completely receives a current media stream of a media type which is the same as the rejected media type within an effective period of a timer for allowing a media transmission if the media stream of the rejected media type is present after reading the media type requested for the simultaneous reception indicated in the response message.

9. A User Equipment (UE) for negotiating with a server to provide simultaneous multimedia services on a session-by-session basis through a Session Initiation Protocol (SIP) core network, comprising:
   a data transceiver for transmitting data and receiving data from the server;
   a controller for sending a simultaneous multi-service request message to the server through the data transceiver, the simultaneous multi-service request message for requesting media streams of an identical media type in multiple sessions, the media streams of the identical media type being provided simultaneously in each of the multiple sessions, wherein the simultaneous multi-service request message includes filtering-information which includes information identifying at least one media type and session to be filtered by the server for the server to determine whether to provide the at least one media type and session according to the identified filtering-information in the simultaneous multi-service request message, and processing data to display multimedia data received through the data transceiver according to the filtering-information; and
   a display for receiving the processed data from the controller and displaying the received data.

10. The UE of claim 9, wherein the controller sends a response message including a response value indicating whether simultaneous reception is required in an associated session when receiving a participation request message including a simultaneous multi-reception proposal value for requesting a response indicating whether a simultaneous multimedia service is used.

11. A method for providing, by a first server, simultaneous multimedia services on a session-by-session basis to at least one User Equipment (UE) through a SIP core network, comprising the steps of:
   receiving, at the server, a simultaneous multi-service request message for requesting media streams of an identical media type in multiple sessions, the media streams of the identical media type being provided simultaneously in each of the multiple sessions from the UE, wherein the simultaneous multi-service request message includes filtering-information which includes information identifying at least one media type and session to be filtered by the first server;
   identifying, by the server, the filtering-information in the simultaneous multi-service request message;
   determining, by the server, whether to provide the at least one media type and session according to the identified filtering-information in the simultaneous multi-service request message; and
   simultaneously transmitting, by the server, simultaneous multimedia services according to the filtering-information in the simultaneous multi-service request message to the at least one UE through the SIP core network as a result.

12. The method of claim 11, further comprising:
receiving, by the first server, a session request message for providing at least one media from a second server for managing a session other than a current session in which the at least one UE participates; and
sending a participation request message to the at least one UE by adding a simultaneous multi-reception proposal value to request a response indicating whether a simultaneous multimedia service is used when a media type of the session request message is the same as a media type provided to the at least one UE.

13. The method of claim 12, wherein the simultaneous multi-reception proposal value is used to request a response indicating whether simultaneous reception of all media provided in different sessions is required.

14. The method of claim 13, further comprising:
receiving a response message including a response value indicating whether simultaneous reception is required for an associated session from the at least one UE in response to a user-selection.

15. The method of claim 14, further comprising:
reading, by the first server, the response value included in the response message when the response message is received from the at least one UE and a media stream is received from the second server sending the session request message; and
transmitting the media stream received from the second server to the at least one UE if the response value included in the response message is a value for simultaneous multi-reception mode in an associated session.

16. The method of claim 15, further comprising:
transmitting the media stream received from the second server when a media stream of a media type currently being received is completely received within an effective period of a timer for allowing a media transmission, if the response value included in the response message is a value for a non-simultaneous multi-reception mode in an associated session after the first server reads the response value included in the response message.

17. The method of claim 12, wherein the simultaneous multi-reception proposal value is used to request a response indicating whether simultaneous reception is required for at least one media type which is the same as a media type of a media stream currently being received in simultaneous sessions.

18. The method of claim 17, further comprising:
receiving a response message including response values indicating whether simultaneous reception is required on a media type-by-media type basis from the at least one UE in response to a user-selection.

19. The method of claim 18, further comprising:
reading, by the first server, a media type requested for the simultaneous reception indicated in the response message when the response message is received from the at least one UE and a media stream is received from the second server sending the session request message; and
transmitting only a media stream of a media type requested for the simultaneous reception.

20. The method of claim 19, further comprising:
reading, by the first server, the media type requested for the simultaneous reception indicated in the response message; and
transmitting a media stream of a rejected media type when the at least one UE completely receives a current media stream of a media type which is the same as the rejected media type within an effective period of a timer for allowing a media transmission if the media stream of the rejected media type is present.

21. A method for receiving, by a User Equipment (UE), simultaneous multimedia services on a session-by-session basis through a Session Initiation Protocol (SIP) core network, comprising the steps of:
sending a simultaneous multi-service request message to a server through the SIP core network, the simultaneous multi-service request message for requesting media streams of an identical media type in multiple sessions, the media streams of the identical media type being provided simultaneously in each of the multiple sessions, wherein the simultaneous multi-service request message includes filtering-information which includes information identifying at least one media type and session to be filtered by the server, for the server to determine whether to provide the at least one media type and session according to the identified filtering-information in the simultaneous multi-service request message;
receiving simultaneous multimedia services of the identical media type on a session-by-session basis through the server according to the filtering-information;
processing the simultaneously received multimedia services; and
displaying the processed multimedia services.

22. The method of claim 21, further comprising:
sending a response message including a response value indicating whether simultaneous reception is required in an associated session when receiving a participation request message including a simultaneous multi-reception proposal value for requesting a response indicating whether a simultaneous multimedia service is used.

23. A User Equipment (UE) for receiving simultaneous multimedia services on a session-by-session basis through a Session Initiation Protocol (SIP) core network, comprising:
a data transceiver for transmitting data and receiving data from the server;
a controller for controlling the data transceiver to send a simultaneous multi-service request message to a server through the SIP core network, the simultaneous multi-service request message for requesting media streams of an identical media type in multiple sessions, the media streams of the identical media type being provided simultaneously in each of the multiple sessions, wherein the simultaneous multi-service request message includes filtering-information which includes information identifying at least one media type and session to be filtered by the server, for the server to determine whether to provide the at least one media type and session according to the identified filtering-information in the simultaneous multi-service request message, and to receive simultaneous multimedia services according to the identified filtering-information in the simultaneous multi-service request message, and for processing the received simultaneous multimedia services; and
a display for displaying the processed multimedia services.

24. The UE of claim 9, wherein the controller sends a response message including a response value indicating whether simultaneous reception is required in an associated session when receiving a participation request message including a simultaneous multi-reception proposal value for requesting a response indicating whether a simultaneous multimedia service is used.

* * * * *